United States Patent [19]

Maher

[11] Patent Number: 4,570,261

[45] Date of Patent: Feb. 11, 1986

[54] DISTRIBUTED FAULT ISOLATION AND RECOVERY SYSTEM AND METHOD

[75] Inventor: John W. Maher, Woodstock, Ill.

[73] Assignee: Motorola, Inc., Schaumburg, Ill.

[21] Appl. No.: 559,981

[22] Filed: Dec. 9, 1983

[51] Int. Cl.⁴ .......................................... G06F 11/18
[52] U.S. Cl. ...................................... 371/16; 364/200; 371/67
[58] Field of Search .................. 371/11, 16, 20, 22, 371/10, 15, 8, 7, 67, 68, 57; 364/200, 900

[56] References Cited

U.S. PATENT DOCUMENTS

| | | | |
|---|---|---|---|
| 3,444,321 | 5/1969 | Pantos | 178/69 R |
| 3,649,963 | 3/1972 | Holm et al. | 371/67 |
| 4,231,015 | 10/1980 | Union | 371/11 |
| 4,298,860 | 11/1981 | Norberg et al. | 340/825.04 |
| 4,298,982 | 11/1981 | Auerbach | 371/30 |
| 4,328,583 | 5/1982 | Stodola | 371/57 |
| 4,342,112 | 7/1982 | Stodola | 371/68 |
| 4,356,546 | 10/1982 | Whiteside et al. | 371/67 |
| 4,374,436 | 2/1983 | Armstrong | 371/11 |
| 4,375,683 | 3/1983 | Wensley | 371/36 |
| 4,380,067 | 4/1983 | Beardsky et al. | 371/11 |
| 4,392,199 | 7/1983 | Schmitter et al. | 371/11 |
| 4,400,694 | 8/1983 | Wong et al. | 340/505 |
| 4,410,983 | 10/1983 | Cope | 371/68 |
| 4,438,494 | 3/1984 | Budde et al. | 371/11 |
| 4,503,534 | 3/1985 | Budde et al. | 371/11 |
| 4,503,535 | 3/1985 | Budde et al. | 371/11 |

Primary Examiner—Michael R. Fleming
Attorney, Agent, or Firm—Donald B. Southard; Thomas G. Berry

[57] ABSTRACT

There is disclosed a system and a method for isolating faults and recovering a distributed system of the type including a plurality of modules to optimized operation. At least some of the modules are active fault recovery modules and include fault detecting means for initializing a fault check routine and sensing faults within the distributed system. Voting means are associated with each active module for placing a vote during each fault check routine in response to a detected fault. Collective vote determining means record the votes of the active modules after each fault check routine and recovery sequence initializing means initializes a fault isolation and recovery sequence in response to a given number of consecutive collective votes exceeding a predetermined value.

29 Claims, 11 Drawing Figures

DISTRIBUTED FAULT ISOLATION AND RECOVERY SYSTEM AND METHOD

FIELD OF THE INVENTION

The present invention relates to a fault isolation and recovery system and method wherein the fault isolation and recovery can be performed in any one of a plurality of modules or nodes distributed throughout the system. The system and method of the present invention finds particular application in systems of the type including a plurality of modules or nodes which must communicate with each other over a common bus.

BACKGROUND

There are many systems which include a plurality of modules distributed along a common link, such as a bus or a plurality of buses. Often, time division multiplexing is utilized to provide efficient information transfer between the distributed modules and to achieve maximum system capacity. In systems of this kind, the bus or buses are divided into a plurality of time slots. Each module is assigned a predetermined time slot into which it can insert information onto the bus and means for receiving information from any one of the time slots. In this manner, any one module is capable of transferring information to any other module, and in turn, capable of receiving information from any other module.

In addition to the foregoing, one of the time slots of one of the buses or a separate bus can be dedicated to permit each module to address or send data to any one of the other modules. Further, a central common control of the data bus or slot is typically provided to control the overall operation of the system. The central common control can provide, for example, system clocks, data bus or slot arbitration, and guard tone generation. Because of the importance of the central common control to the system, it is typically provided in a redundant manner so that if one central common control develops a fault, the system can be switched over to the other redundant central common control.

A problem which can arise in such a system is the location of the fault detecting intelligent module of the system. If it resides in a central, stand alone location, system reliability is compromised should the central fault detecting module or node fail.

Protection against misuse of the buses is another problem. Module failure of any unshared circuitry associated with communicating on the buses could render the buses either totally or partially inoperative.

Prior art systems have addressed this problem by switching to redundant buses and bus devices. While such approaches can be generally successful, they exhibit certain undesirable effects. First, it increases system cost. This results because all bus drives and related circuitry must be duplicated. Second, total system capacity may not be realized with just one time division multiplexed (TDM) bus. As a result, a plurality of redundant buses may be required.

Prior art systems are generally arranged so that if a module failure renders one of the buses inoperative, all the buses may be switched over to redundant buses or just the failed bus may be switched to its redundant bus. Neither of these arrangements is totally satisfactory, and in the latter one, additional input-out or decoding circuitry must be provided for every TDM switch user to selectively and properly make the switch. This approach both adds cost to the system and adversely affects system reliability.

One improvement to prior art systems of this type is fully disclosed and claimed in copending U.S. application Ser. No. 511,701 filed July 7, 1983 for Method and Apparatus For The Selection of Redundant System Modules, which application is assigned to the assignee of the present invention and incorporated herein by reference. The system there disclosed includes a redundant central common control referred to as MUX Common. However, the switching between the main MUX Common and the redundant MUX Common is not initiated by a centrally located fault detecting module. Instead, a plurality of modules associated with the buses are active fault detecting modules or nodes, each continuously checking the system in parallel for faults. When a fault is detected by one of these active modules, it places a vote indicating that a fault has been detected. If a predetermined number, for example, a majority, of the active modules vote, the system then switches from the then active MUX Common to the other MUX Common. Hence, the switching to the redundant module is not commanded by a single fault detecting module, but instead, by a majority of a plurality of fault detecting modules distributed throughout the system. As a result, since a single fault detecting node is not relied upon, system reliability is greatly improved.

Even though the foregoing system exhibits many advantages over prior systems for detecting faults, the switching to a redundant MUX Common may not always rectify the fault or problem with the system. The present invention, however, provides a further improvement thereto in that not only is the fault detection distributed throughout the system, but the fault isolation and recovery is also distributed throughout the system as well. As a result, a single node is not relied upon for fault isolation and recovery, but instead, this function is distributed throughout the system so that if one fault isolation and recovery node fails, another one immediately takes its place to restore the system to optimized operation.

It is therefore a general object of the present invention to provide a new and improved distributed fault isolation and recovery system and method for recovering a system of the type including a plurality of modules or nodes which experience a fault in an optimized configuration.

It is a further object of the present invention to provide such a system and method wherein the fault isolation and recovery process is initialized based upon a distributed detection of a fault.

It is a still further object of the present invention to provide such a system and method wherein any one of a plurality of modules or nodes includes means for performing the testing required for recovering the system.

It is still another object of the present invention wherein the node or module performing the testing of the system must pass internal testing prior to proceeding with the fault isolation and system recovery.

SUMMARY OF THE INVENTION

The invention provides a system for isolating faults and recovering a distributed system of the type including a plurality of modules to optimized operation. At least some of the modules are active fault recovery modules and include fault detecting means for initializing a fault check routine and sensing faults within the distributed system. Voting means are associated with each active module for placing a vote during each fault check routine in response to a detected fault. Collective vote determining means record the votes of the active modules after each fault check routine and recovery sequence initializing means initializes a fault isolation and recovery sequence in response to a given number of consecutive collective votes exceeding a predetermined value.

The present invention also provides a method of isolating faults and recovering a distributed processing system including a plurality of modules to optimized operation. The method includes the steps of periodically detecting for faults within the system at given ones of the modules, generating a vote at those given ones of the modules detecting a fault within the system, collecting the votes as a collective vote, and initializing a recovery sequence when a given consecutive number of the collective votes exceed a predetermined value.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several Figures of which like reference numerals indentify identical elements, and wherein:

FIGS. 4 through 8D are flow charts illustrating the fault isolation and recovery routine for each of the active fault recovery modules of the system.

DESCRIPTION OF THE PREFERRED EMBODIMENT

Figure 1:
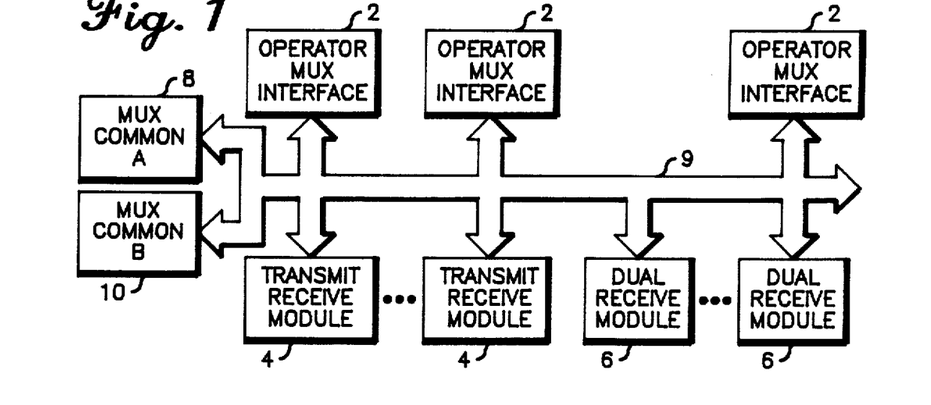
FIG. 1 is a functional block diagram of a distributed processor system utilizing the present invention.

Referring now to the drawings, and more particularly to FIG. 1 thereof, a distributed system in the form of a communication control center utilizing the present invention is illustrated. The communication control center includes multiple modules of three distinct types which communicate with each other by way of a time division multiplexing (hereinafter referred to as TDM) network. The control center system comprises a plurality of operator MUX interface (OMI) modules 2, a plurality of Transmit Receive (TR) modules 4 and a plurality of Dual Receive (DR) modules 6, all of which communicate with each other via the BUS 9 or other acceptable equivalent. In accordance with this preferred embodiment, the OMI modules 2 are active fault recovery modules of the system. The other modules of the system are passive modules with respect to the fault isolation and recovery process. Communication between the modules is controlled by a fourth type of module referred to as the MUX common module 8 or 10, which are redundant common modules. The MUX common module 8 and 10 arbitrate access to a dedicated data channel or a dedicated data bus on the TDM BUS 9 or equivalent and also output synchronization signals necessary for other forms of communication over the network. The MUX common modules are therefore of critical importance to the system since they represent common elements, the failure of which would cause failure of the entire network. As disclosed in the aforementioned copending U.S. application Ser. No. 511,701, filed July 7, 1983 which is incorporated herein by reference, an extremely reliable mechanism is provided to insure that the MUX common modules 8 and 10 functions do not fail. As disclosed therein, the operation of the active MUX common modules 8 or 10 is monitored and the operation from the active MUX common module 8 or 10 to the inactive MUX common module 8 or 10 is transferred should the active module fail. For a complete description of the communication control center of FIG. 1, reference may be had to copending U.S. application Ser. No. 511,692, filed July 7, 1983, for Time-Division Multiplex Communications Control System, which application is also assigned to the assignee of the present invention.

Figure 2:
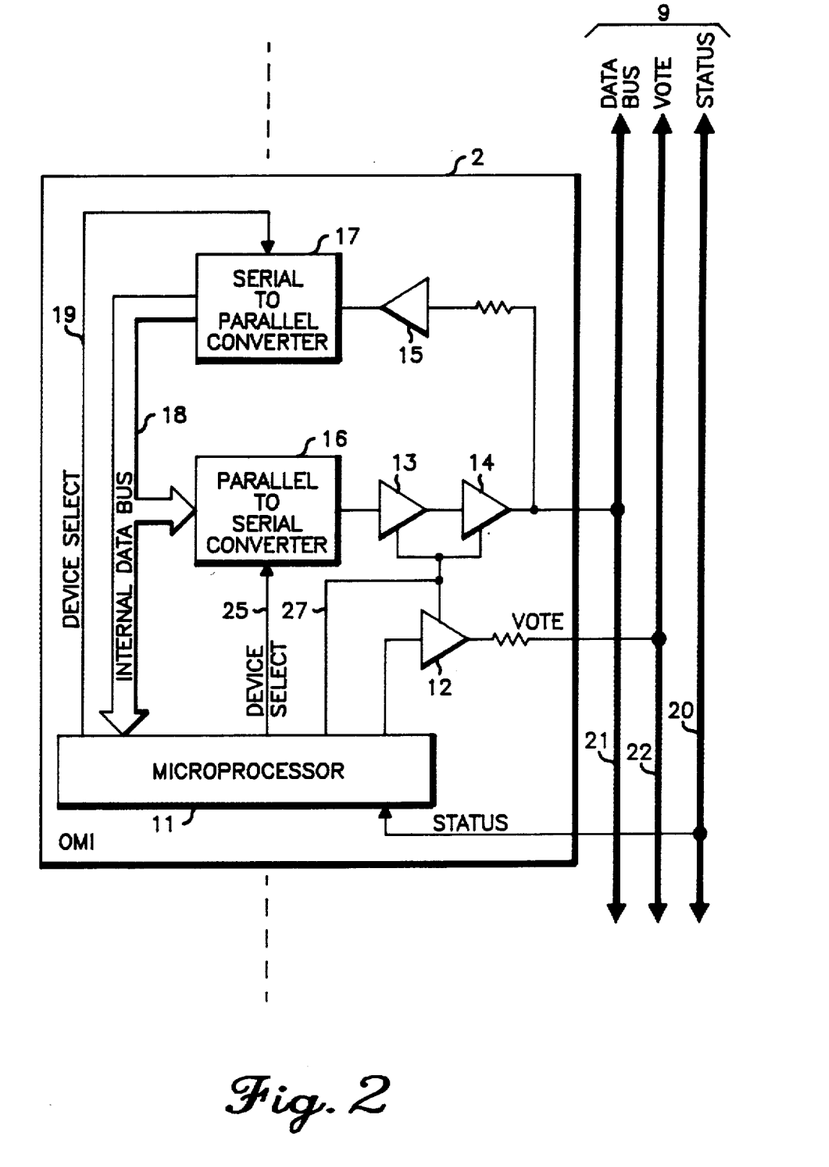
FIG. 2 is a block and electrical schematic diagram illustrating in greater detail one of the modules of the system of FIG. 1.

Referring now to FIG. 2, it illustrates in general detail the configuration of each OMI module 2 in accordance with the present invention. Each OMI module 2 includes a microprocessor 11, such as an MC6809 manufactured by Motorola, Inc., a plurality of bus drivers 12, 13, and 14 which can be MC14503 bus drivers manufactured by Motorola, Inc., a buffer 15, a parallel to serial converter 16, and a serial to parallel converter 17.

The bus 12 as illustrated in FIG. 1 includes in part a status lead 20, a dedicated data bus 21, and a vote lead 22. The data bus 21 is utilized within the system for transferring data between the various modules of the system except for the MUX common modules 8 and 10. The data carried on the data bus 21 is transferred serially between the various modules. The vote lead 22 is utilized, as will be more fully explained hereinafter, for determining when there is a fault within the system. Suffice it to say here that each OMI module has stored within its microprocessor 11 a routine which continuously detects for faults within the system. When a fault is detected, each OMI module 2 will output a vote onto the vote lead 22. The votes, as will be described hereinafter, are recorded in the MUX common modules 8 and 10, and if the collective vote exceeds a predetermined value, a fault within the system will be indicated. The first such collective vote causes transfer from the active MUX common to the other redundant MUX common. After the transfer, each OMI module 2 reinitializes its fault detecting routine to determine if the problem within the system has been corrected by transferring operation to the redundant MUX common. If the problem within the system has not been corrected by the switch to the redundant MUX common, and the resultant error is such that any OMI module cannot properly access the data bus, then any OMI module experiencing this type of error will place another vote onto the vote lead 22. If the collective vote exceeds a predetermined value, then another transfer of MUX commons, in this case back to the original MUX common, will occur. The occurrence of a second switch of MUX commons is cause for the system to proceed into the fault isolation and recovery routine which will be described hereinafter in greater detail. The status lead 20 is utilized to indicate which MUX common module 8 or 10 is presently active. This indication depends upon the level on the status lead 20.

The buffer 15, the serial to parallel converter 17, and an internal data bus 18 permit data on the data bus 21 to be received by the OMI module 2 at its microprocessor 11. To that end it can be noted that the input to the buffer 15 is coupled to the data bus 21. The output of buffer 15 is coupled to the serial to parallel converter 17. The serial to parallel converter 17 receives the serialized data and converts it to a parallel data word. That data word is inputted into the microprocessor 11 over the data bus 18 in response to a command from the microprocessor 11 over a device select lead 19.

To permit the OMI module 2 to output data onto the data bus 21 from its microprocessor 11, the internal data bus 18 is coupled to the input of the parallel to serial converter 16. The output of the parallel to serial converter 16 is coupled to the data bus 21 through the bus drivers 13 and 14. When data is to be transferred from the microprocessor 11 onto the data bus 21, a parallel digital data word will be provided from the microprocessor and transferred to the parallel to serial converter 16 over the internal data bus 18. Upon command from the microprocessor 11 over the device select lead 25, the parallel data word will be serially conveyed from the parallel to serial converter 16, through the bus drivers 13 and 14, and onto the data bus 21.

For placing a vote onto the vote lead 22, the bus driver 12 is coupled to the vote lead 22. When an OMI module 2 detects a fault within the system and places a vote, the output of the bus driver 12 will change state between a low and a high level for placing the vote onto the vote lead 22. During the fault isolation and recovery sequence, as will be more fully described hereinafter, it is necessary for each OMI module 2 to be removed from the data bus 21. This removal is referred to herein as a tristate condition, and the tristate condition is achieved on command by the microprocessor 11 over a disable lead 27. When the OMI module 2 is tristated, the bus drivers 12, 13, and 14 will appear to the data bus 21 to be a high impedance. The term TRI-STATE, is a registered trademark of National Semiconductor Corporation, used to describe a particular family of logic devices. Conversely, as used herein, the term tristate imports the common technical meaning as understood by those of ordinary skill in the art (i.e. three states: logic low, logic high, and a high-impedance state). Because these bus drivers are disabled, the OMI module 2 will not be able to place a vote onto the vote lead 22 or place data onto the data bus 21. However, a tristated OMI will still be able to receive data from the data bus 21 in the manner as previously described.

Figure 3:
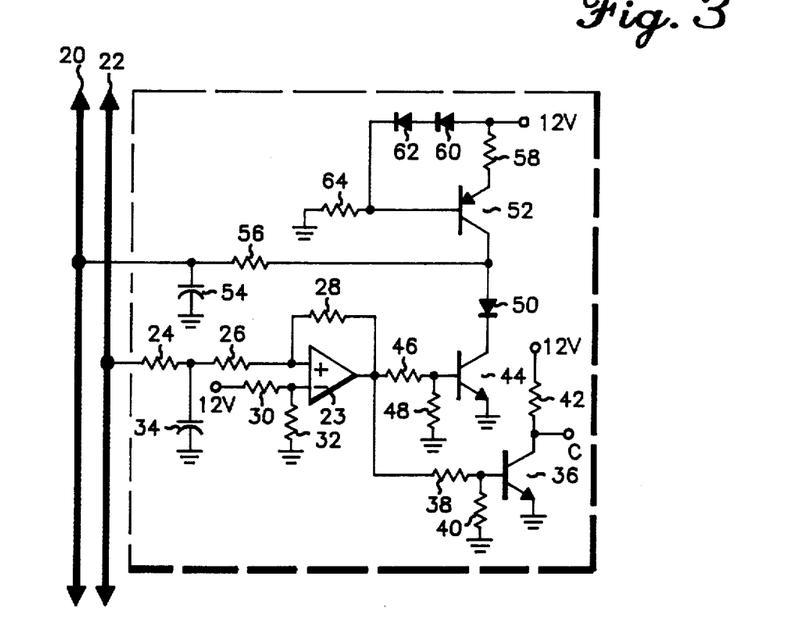
FIG. 3 is a block and electrical schematic diagram illustrating a portion of another module of the system of FIG. 1.

Referring now to FIG. 3, it illustrates in general detail the circuitry of the MUX commons 8 or 10 for recording the collective vote from the OMI modules 2 and determining if the collective votes exceed a predetermined value. As shown in FIG. 3, the MUX common modules include a comparator 23 which has its positive input terminal connected to the vote lead 22 through the series resistors 24 and 26. The output of the comparator 23 is connected to the positive input terminal thereof by way of the feedback resistor 28. The negative input terminal of the comparator 23 is connected to a 12 volt power supply through the resistor 30 and to ground through the resistor 32. A capacitor 34 has one end connected to the junction of the resistors 24 and 26 and its other end connected to ground.

The base of the NPN transistor 36 is connected to the output of the comparator 23 through the resistor 38, the base of the transistor 36 also being connected to ground through the resistor 40. The emitter of the transistor 36 is also connected to ground. The collector of the transistor 36 is connected to a 12 volt power supply through the resistor 42 and has a terminal C to enable or disable the remaining circuitry (not shown) of the MUX common module. The remaining circuitry is used to control communication between the various other modules as mentioned herein before, the details of which are not necessary for a full and complete understanding of the present invention. The output of the comparator 23 is also connected to the base of an NPN transistor 44 through the resistor 46. The base of the transistor 44 is also connected to ground through the resistor 48. The emitter of transistor 44 is also connected to ground. The collector of the transistor 44 is connected to the cathode of the diode 50. A PNP transistor 52 has its collector connected to the anode of the diode 50 and to the status lead 20 through the capacitor 54-resistor 56 combination. The emitter of the transistor 52 is connected to the 12 volt power supply through the resistor 58. The base of the transistor 52 is connected to the 12 volt power source through the series diodes 60 and 62 and is also connected to ground through the resistor 64.

The operation of the MUX commons in recording the collective votes from the OMI modules 2 and for switching the MUX commons will now be described. In this example, the status lead 20 is at a low logic level when the MUX common A module 8 is active and is at a high logic level when the MUX common B module 10 is active. The status lead 20 is driven by the circuit comprised of the transistors 44 and 52 each having their respective associated circuit components. The transistor 52 with its associated bias components 60, 62, and 64 forms a constant current source and has its emitter voltage held at approximately 11.3 volts by the diode 60, the diode 62 and the resistor 64. The emitter current is therefore 0.7 volts divided by the resistance of the resistor 58 and is used to raise the status lead 20 to a high logic level through the capacitor 54-resistor 56 combination. When the output of the comparator 23 is at a high logic level, the transistor 44 is turned on through the resistors 46 and 48 and the current supplied by the transistor 52 is drawn to ground through the transistor 44 and the diode 50. This also pulls the status lead 20 to ground. Such a condition indicates that MUX common A module 8 is enabled and the MUX common B module 10 is disabled. When the output from the comparator 23 is at a low logic level, the transistor 44 is turned off which raises the status lead 20 to a high logic level. The resistor 56, the capacitor 54 and the diode 50 are included to protect the circuitry against accidental shorts. The status lead 20 is monitored by each of the microprocessors 11 within their respective OMI modules 2.

Each of the microprocessors 11 includes an executive diagnostic routine which detects for faults within the system. This routine and the fault isolation and recovery routine included within these microprocessors will be described in greater detail hereinafter.

When the microprocessor 11 detects an error which indicates a fault within the system, it interrogates the status lead 20 to determine whether the MUX common A module 8 or the MUX common B module 10 is active. It then adjusts its vote output signal to vote that the inactive or stand-by MUX common module 8 or 10 be activated. In this embodiment, a high logic level signal of 12 volts is outputted to vote for the MUX common A module 8 and a low logic level signal of 0 volts is outputted to vote for the MUX common B module 10. Assuming for example that the MUX common A module 8 is active, the status lead 20 would therefore be indicating a low logic level. Then, if a failure occurs within the system, each of the microprocessors 11 of the OMI modules 2 will detect the fault and interrogate the status lead 20 to determine that the MUX common A module is currently active. Each of the microprocessors 11 will then respond by adjusting its vote output to the low logic level indicating a vote to activate the MUX common B module 10.

The actual voltage on the vote lead 22 is determined by superposition of the vote output signals from all of the microprocessors 11 in the system. In the case where all of the microprocessors 11 determine that there is a fault within the system and that therefore the MUX common A module 8 should be active, each of them would output a high logic level signal of 12 volts and the vote lead 22 would have a level of 12 volts. Conversely, in the event that all of the microprocessors 14 determine a fault within the system and that MUX common B module 10 should be active, each of them would output a low logic level signal of 0 volts and the vote lead 22 would have a level of 0 volts. However, it is conceivable that not all of the microprocessors 11 will generate the same vote output and, therefore, since each vote output signal has the same output impedance of 4.7 Kohms, the following formula expresses the voltage on the vote lead 22 for any given combination of vote output signals:

$$V_{VB} = 12 \times A \quad (1)$$

where $V_{VB}$ is the voltage on the VOTE BUS line 22;

A is the number of active (i.e., from OMI modules which have not removed themselves from the system) microprocessors 11 voting for the MUX common A module 8 expressed in percent (%); and 12 is the high logic level voltage expressed in volts.

A majority vote for MUX common A module 8 can, therefore, be recognized as a voltage greater than 6 volts on the vote bus line 22 by the application of equation (1). On the other hand, a majority vote for MUX common B module 10 can be recognized as a voltage less than 6 volts on the vote lead 22. Hence, when the collective vote from all of the OMI modules 2 exceeds a predetermined value indicating that a majority of the OMI modules 2 have voted in response to the detection of a fault within the system, the MUX commons will be switched.

The vote lead 22 is monitored by the vote collecting circuitry in the MUX common A module 8 comprised of the comparator 23 and associated resistor 24 and capacitor 34. The voltage on the vote lead 22 is first filtered by the resistor 24 and capacitor 34 combination to remove any noise components. The filtered signal is than routed to the positive input of the comparator 23. The negative input of the comparator 23 is biased to half of the supply by the equal value resistors 30 and 32. If the voltage on the vote lead 22 exceeds half-supply indicating that a majority of the microprocessors 11 have voted for the MUX common A module 8, then the output of the comparator 23 will swing high indicating that the plus terminal is more positive than the negative terminal. Similarly, the output will swing low if the voltage on the vote lead 22 is below half-supply indicating that that a majority of the microprocessors 11 have voted for the MUX common B module. The resistor 28 is used to provide positive feedback in order to create a small amount of hysterisis which prevents the comparator 23 from oscillating in the event that the vote lead 22 is substantially equal to half-supply. When the output of the comparator 23 is at a high logic level, the MUX common A module 8 is enabled by the inverter circuit formed by the transistor 36 having the base resistors 38 and 40 and the collector resistor 42, at terminal C. When the output of the comparator 23 is at a low logic level, the MUX common A module 8 is similarly disabled at the terminal C. Thus, in the preferred embodiment, a majority (i.e., more than 50 percent) of the microprocessors 11 must vote for the desired MUX common module, that is, the collective vote must be more than 50 percent before it will be activated. However, it should be readily apparent to those skilled in the art that the comparator circuit 23 could be replaced with other components such as a microprocessor so that any predetermined number of votes could be selected to transfer the operation from one MUX common module to another. Also, as will become apparent hereinafter, and in accordance with the preferred embodiment of the present invention, when the collective votes of the OMI modules 2 represent two consecutive collective votes, and thus, after the MUX commons have been switched twice, the entire system will go into the fault isolation and recovery sequence as will be described hereinafter.

The error servicing routine, described in FIGS. 4 through 8 illustrate the procedure performed on any reported error, based on a majority vote. The error check routines continually monitor specific system functions and alert the error servicing routine when an error has occurred. These error check routines are as indicated below.

1. Sound Off Checks

Each module in the system is required to send a "sound off" data message at fixed time intervals. These "sound off" messages are logged by each OMI module as they are received off the data bus 21. At the end of each sound off interval each OMI module compares the current interval with a reference interval to verify that all modules are present. One type of error is reported if one module is missing and a second type of error is reported if two or more modules are missing. The former error type is cause for only one vote since the error is not inhibiting other modules from successfully using the data bus, and the error can be isolated to one module without executing a fault isolation and recovery sequence. The persistence of the latter error type is cause for multiple votes possibly producing a fault isolation and recovery sequence.

2. Sent Packet Check

When each OMI module transmits a message on the data bus, it also reads back this message through buffer 15, serial to parallel converter 17 and internal data bus 18. The latter portion of this message contains cyclic redundancy check (CRC) information. Failure to read the CRC transmitted will produce a type error to the error servicing routine which will cause multiple voting and a possible fault isolation and recovery sequence if the error persists after the first vote and switch of MUX commons.

3. MUX Common Guard Tone Check

Guard tone, for keying base stations in a tone controlled system, is available to all modules in the system. This tone is generated on the MUX common in an analog fashion. This provision has allowed for a method which requires, on a periodic basis, all modules to digitize this tone and source it into its assigned slot on the TDM bus. An OMI module will listen to this slot, convert it back to analog form, and detect its presence. This error check routine allows each OMI module to verify that other modules are remaining in their assigned slots.

This method is incorporated in the "recovery" sequence to isolate modules which have "jumped" to another module's slot on the TDM bus.

4. Scheduled MUX Common Switch

To prevent a "silent" failure on the redundant MUX common "scheduled" switches occur. This verifies not only the integrity of the "idling" MUX common, but also the vote collecting circuitry which is the communications link between each OMI module in the case of a data bus fault.

Referring now to FIGS. 4 through 8, they illustrate the error servicing routine which is performed within the system by the OMI modules 2 for servicing faults within the system and isolating the faults and recovering the system to an optimized configuration. Each of the OMI modules 2 is capable of performing the entire error servicing routine illustrated in FIGS. 4 through 8. However, in accordance with the present invention, not all of the OMI modules may be called upon to perform the recovery sequence. Each of the OMI modules 2 has a specific time slot address and, upon the initiation of the recovery sequence, each OMI module sets a timer which is weighted according to its address. The OMI module with the lowest address is the first OMI module to assume command of the system for isolating the fault and recovering the system. Each OMI module, when it becomes its turn to isolate the fault and recover the system, untristates, and first performs a series of internal checks. Since this OMI module will be the only data bus user at this time, any internal check errors cannot be assumed to be dependent on other modules, as they are tristated. These internal checks include the "sent packet check," where this untristated OMI module verifies that it can access the data bus properly by sending a "dummy" message to itself and the "MUX common guard tone" check which verifies that this OMI module is accessing the correct slot on the TDM bus. Successfully passing these internal checks will assure that errors detected during the subsequent interrogation process cannot be attributed to the "controlling" OMI module.

If the OMI module passes these internal checks, it can proceed with the interrogation sequence. The controlling OMI module begins the interrogation process, or recovery sequence by sending a data message to only one module which will cause this module to untristate. All data messages sent by the controlling OMI module require an acknowledgment data message by the interrogated module. Another data message, an "echo" message and subsequent acknowledgment message will verify two way communication over the data bus with two modules untristated. Having successfully passed this portion of the interrogation process the interrogated module is next asked to source guard tone into its assigned slot on the TDM bus. The controlling OMI module will listen to this module and detect its tone. This will verify that the polled module is not sourcing into the wrong slot on the TDM bus. After completing these checks the controlling OMI module sends it a tristate message. This completes the interrogation of a given module in the system. All modules in the system are similarly polled. A complete poll of all modules will reveal a module which failed to respond correctly. At the end of the polling process only those modules who responded correctly will be sent a final "power up" message by the controlling OMI module. This will end the recovery sequence and return the system to normal operation.

When the controlling OMI module encounters a module, during the recovery sequence, which is rendering the data bus inoperative, it would now become impossible to send it a "tristate" message. To overcome this, each module while being interrogated must continually hear from the controlling OMI module within fixed time intervals. If this time interval is exceeded, then the interrogated module will tristate by default. The controlling OMI module will allow for this time interval to elapse before continuing with the recovery sequence.

In the event that the first OMI module in the system is also the module which had the failure, causing the recovery sequence it will proceed with the interrogation sequence described above. At the end of the polling process it will evaluate the results and note that no module responded correctly. Since no module responded while being interrogated, the controlling OMI module will tristate and, therefore, pass control to the next OMI module. If such occurs, the past controlling OMI module will recreate its weighted timer so as to be last in the list. In this way all other system OMI modules will have an opportunity to complete the interrogation sequence. This same procedure of recreating a weighted timer is executed if the controlling OMI module fails its internal checks as described earlier.

Logistical questions surface when multiple failures are considered. These problems are handled by the software algorithm by prioritizing specific errors and selecting the more functional MUX common. Prioritization of possible system failures is:

1. Data bus errors: All failures which render the data bus inoperative. These include system clock, data arbiter failures on the MUX common, two or more missing modules, and misuse of the data bus by a given module. These errors will cause a double vote and subsequent recovery sequence if they persist after the first vote and switch.

2. Failure of one module to "sound off" will cause a vote. If the MUX common switch occurs, and the module is still missing, a reset message will be sent to this module in an attempt to restore it to normal operation. Regardless of the outcome, a second vote toward a recovery sequence will not occur.

3. Loss of guard tone generation on the MUX common is reason for an OMI module to vote for the redundant MUX common. Regardless of the outcome, a second vote toward a recovery sequence will not occur.

Figure 4:
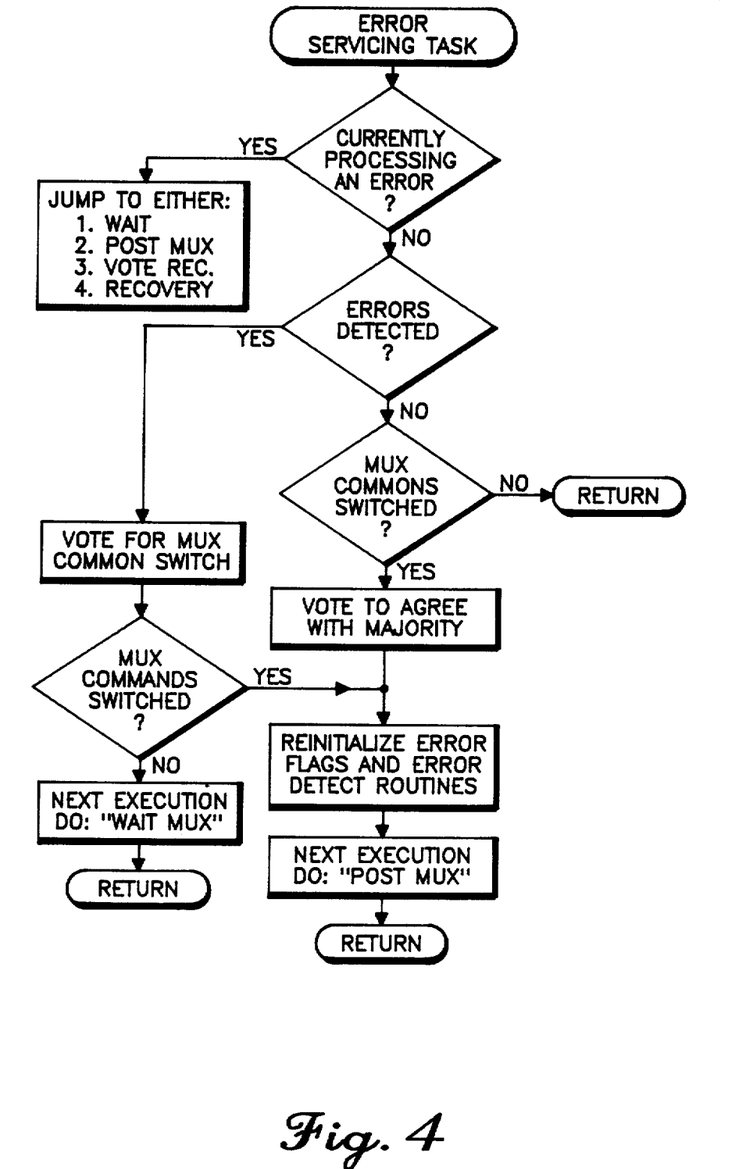

Referring now more particularly to FIG. 4 as illustrated, the error servicing routine begins with each OMI module determining whether a fault or error in the system is currently being processed. If the answer is "no", then the OMI module determines whether it detected any errors. These errors include the previously mentioned, data access, sound off, or MUX common guard tone generation errors. If the answer is "no", then the OMI module proceeds to determine whether the MUX commons have been switched. If the answer is "no", the OMI module returns to the executive control or main operating system which supervises all of the routines within the system. Therefore, when a "return" is indicated, this indicates that the OMI module returns to the control of the executive control or main operating system.

If the OMI module determines that the MUX commons have not been switched and returns, this indicates that the system is operating properly and that there are no faults to be acted upon. If the OMI module did not detect any errors but the MUX commons have been switched, then the OMI module will vote to agree with the majority of the other OMI modules. This indicates that a majority of the other system OMI modules have detected a system error as described earlier, and voted before this OMI module detected any error. In any event, this OMI module must stay in sequence, should a recovery sequence be forthcoming and vote as did the majority.

If the OMI module did detect an error, then it proceeds to vote for a MUX common switch according to the sequence indicated in FIG. 4.

Referring now to FIG. 4, after the OMI module votes for the MUX common switch, it then determines whether the MUX commons have been switched by the condition of the status lead 20. If the answer is "yes", this indicates that the majority of the system OMI modules have already detected an error and voted. The OMI module will then reinitialize its error flags and its error detect routines and upon its next execution, it will perform its "post MUX" routine to be described hereinafter. In brief, the "post MUX" routine will evaluate the integrity of the redundant MUX common.

If the MUX commons were not switched, this indicates that this OMI module is a minority OMI module and should allow time for the other OMI modules to vote. Hence, its next execution is to do a "wait MUX" routine to be described hereinafter.

Referring again to FIG. 4, if the OMI module determines that an error is currently being processed, then it will jump to one of four routines indicated as a Wait, Post MUX, Vote Recovery, or Recovery routine. Each of these is described hereinafter in greater detail.

Figure 5:
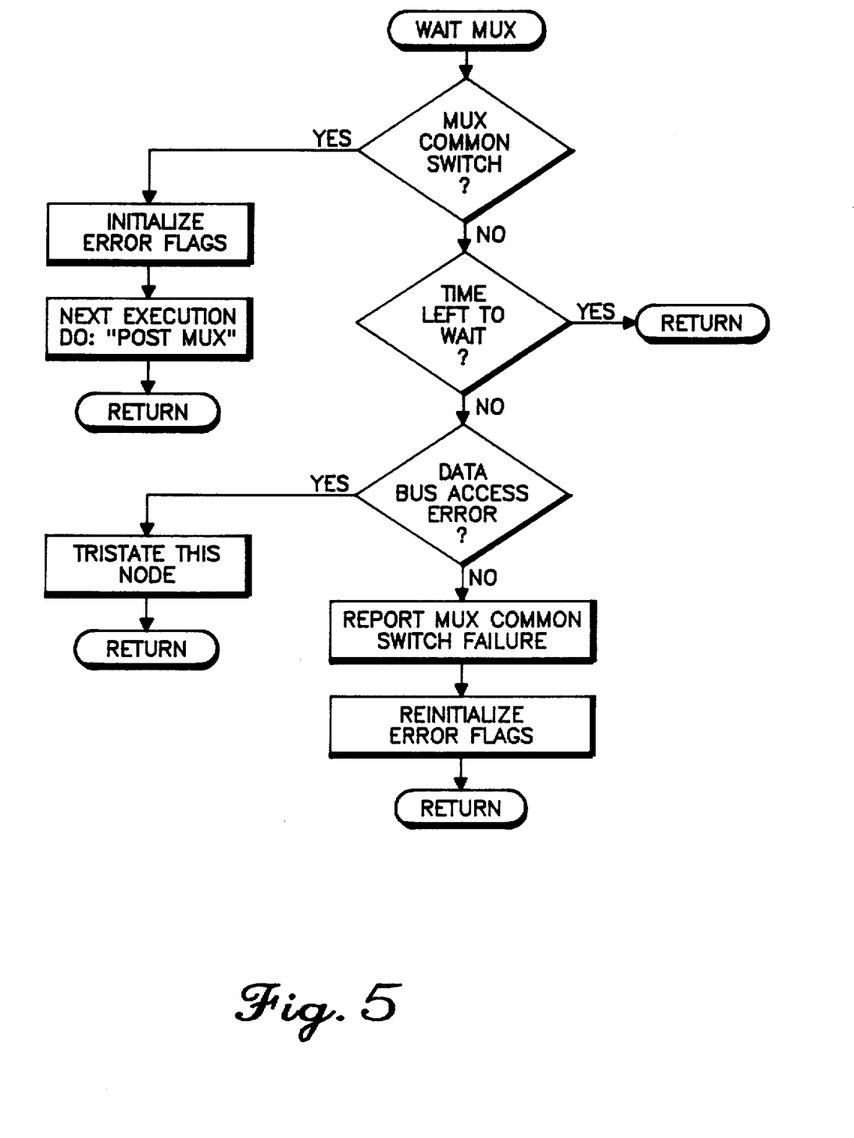

Referring now to FIG. 5, this illustrates the Wait MUX routine. The OMI module first determines whether the MUX commons have been switched. If the answer is "no", then it determines whether it has time remaining to wait. If the answer is "yes", than the OMI module returns and allows time for the other system OMI modules to detect error. If the answer is "no", then the OMI module proceeds to determine if there has been a data bus access error. If the answer is "no", it reports a MUX common switch failure and reinitializes its error flags and returns. This results because no further error processing action can occur without a consensus of the majority of the OMI modules.

If the OMI module determined that there was no time to wait and that the data bus access error did occur, then the OMI module will tristate itself and then return. This removes this OMI module including its vote from the system due to a failure to properly access the data bus.

If initially the OMI module determined that the MUX commons had been switched, then it proceeds as indicated in FIG. 5, to initialize its error flags and then execute the post MUX routine upon its next execution. This indicates that the majority of the system OMI modules have detected an error and that it is now time to evaluate the redundant MUX common. In initializing its error flags, each OMI module, in essence, is forgetting past errors and only remembering that some error, as described earlier, has caused a vote and subsequent MUX common switch. What further action is needed will be determined by new error input collected while operating under the redundant MUX common.

Figure 6:
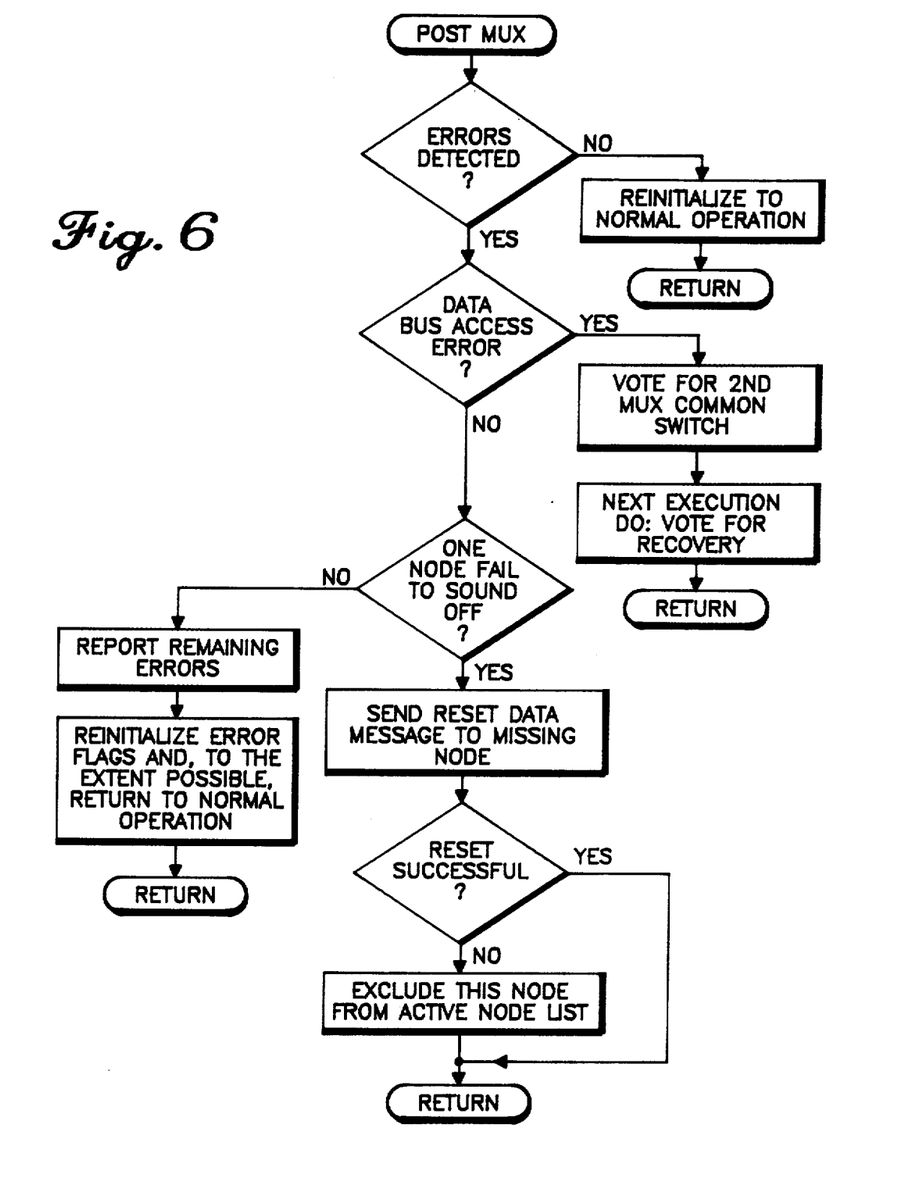

Referring now to FIG. 6, which illustrates the post MUX routine. In evaluating the redundant MUX common, the OMI module first determines whether errors are detected. If no errors are detected, the OMI module reinitializes to normal operation. This indicates that the previously active MUX common was faulty and the switch to the redundant MUX common resolved the system fault. The OMI module then returns.

If errors are detected while operating under the redundant MUX common, then the OMI module determines whether that error was a data bus access error. If the answer is "yes", then the OMI module votes for a second MUX common switch. After so voting, the OMI module will upon its next execution go into the vote for recovery sequence and return. In accordance with this preferred embodiment, data bus access errors are the highest priority errors in the system and constitute a second vote for a recovery sequence.

If there was no data bus access error, then the OMI module proceeds to the sequence of operations illustrated in FIG. 6. First, the OMI module determines whether one node or module failed to sound off. In accordance with the present invention, each system node or module is required to send a data packet over the data bus at predetermined intervals, such as, for example, every five seconds. This allows the OMI modules to determine whether all modules are active on the bus. If one node failed to sound off, then the OMI module sends a reset data message to the missing node. This is done because the missing module is not inhibiting access to the data bus by other modules in the system. The OMI module determines whether the reset was successful. If the reset was not successful, then the missing node is excluded from the active node list and the OMI module then returns. If the reset was successful, the OMI module then also returns. As a result, a missing node or module can be restored without upsetting the rest of the system. It is of course, to be understood, that each of the OMI modules should have detected the missing node and each sent a reset message to it.

If initially, the OMI module determined that no node failed to sound off, the OMI module then reports any remaining errors and then reinitializes its error flags to the extent possible and then returns to normal operation.

Figure 7:
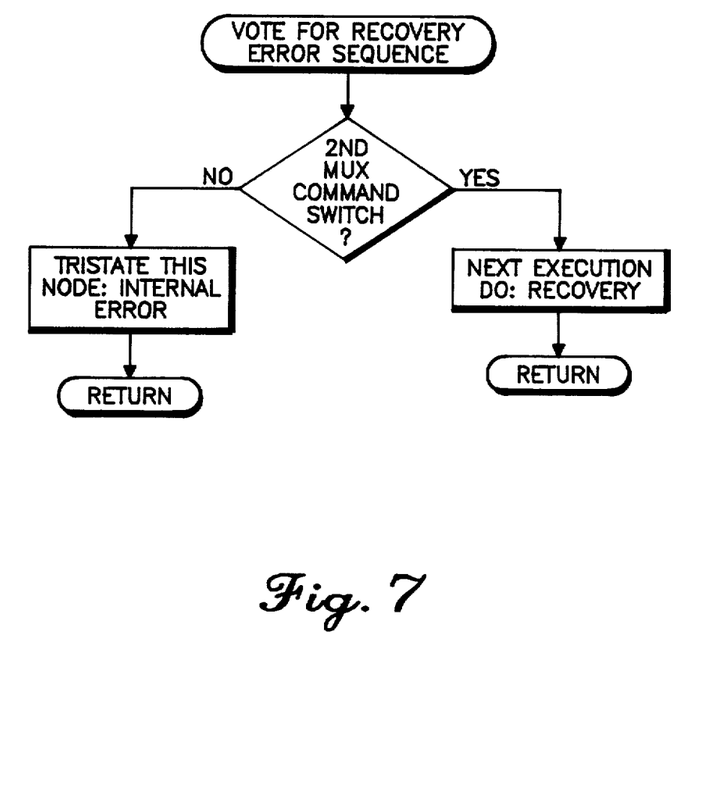

FIG. 7 illustrates the Vote for Recovery error sequence. First, the OMI module determines whether the second MUX common has been switched. In other words, the OMI module determines whether two consecutive collective votes from the OMI modules have exceeded a predetermined value, here a majority of the OMI modules. If the second MUX common switch did occur, the OMI module will upon its next execution go into the recovery sequence and then return. This indicates that the majority of the system OMI modules have encountered data bus access errors and voted for a recovery sequence.

If the OMI module however did not detect a second MUX common switch, then this OMI module would tristate itself because of an internal error within itself involving data bus access. This OMI module is a minority OMI module and therefore, it will tristate thereby completely removing itself along with its vote from the system.

Referring now to FIGS. 8A through 8D, these Figures illustrate the Recovery sequence which takes place after two consecutive collective votes of the OMI modules have exceeded a predetermined value. This condition causes the recovery sequence to be initialized. First, as indicated, all OMI modules tristate from all of the system buses. Also, the passive modules of the system will also tristate within a predetermined period of time after the recovery sequence has initiated. This occurs because passive modules must periodically receive "stay awake," or "remain untristated" messages from the system OMI modules. Each OMI module then initializes its recovery flags and creates a weighted timer. The weighted time is based on the module or node address. The OMI module having the lowest node address will time out first, thereby, becoming the controlling OMI module, which first begins the system interrogation process.

Figure 8A:
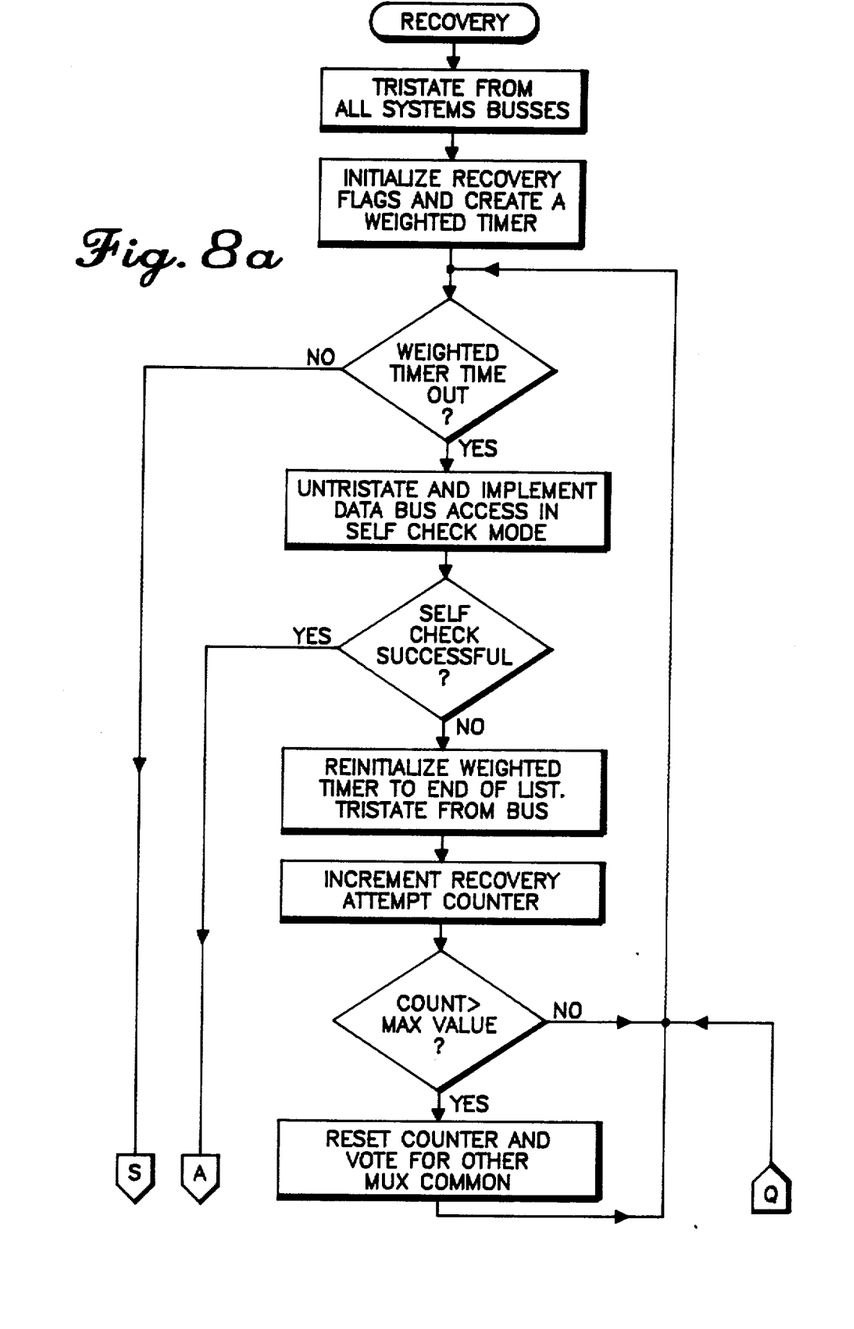

The OMI module then determines whether its weighted timer has expired. If it has, then the OMI module knows that it is the next one, which may be the first OMI module, to assume control of the recovery process. The OMI module assuming control first untristates and performs a series of selfchecks. The first selfcheck is a data bus access in the form of a "dummy" message to itself. As a second check it sources guard tone into its assigned slot on the TDM bus, which it then detects to verify that it has not jumped into another slot. The OMI module then determines whether the selfcheck routine was successful. If the selfcheck routine was not successful, then the OMI module reinitializes its weighted timer and then goes to the end of the list of OMI modules to perform the recovery sequence. The OMI module then tristates itself from the bus.

As indicated in FIG. 8A, after tristating itself from the bus, the OMI module increments a recovery, attempt counter. It then determines whether the count is greater than some maximum value. The maximum value being chosen such that any further attempts to successfully pass the selfcheck under this MUX common will no doubt prove fruitless. If that count is greater than the maximum value, then the OMI module resets its counter and votes for another MUX common switch. This indicates that each OMI module has had a chance to test itself and all tests have been unsuccessful. As a result, the system will continue to switch between the MUX commons until the most intelligent or able MUX common is found.

Figure 8B:
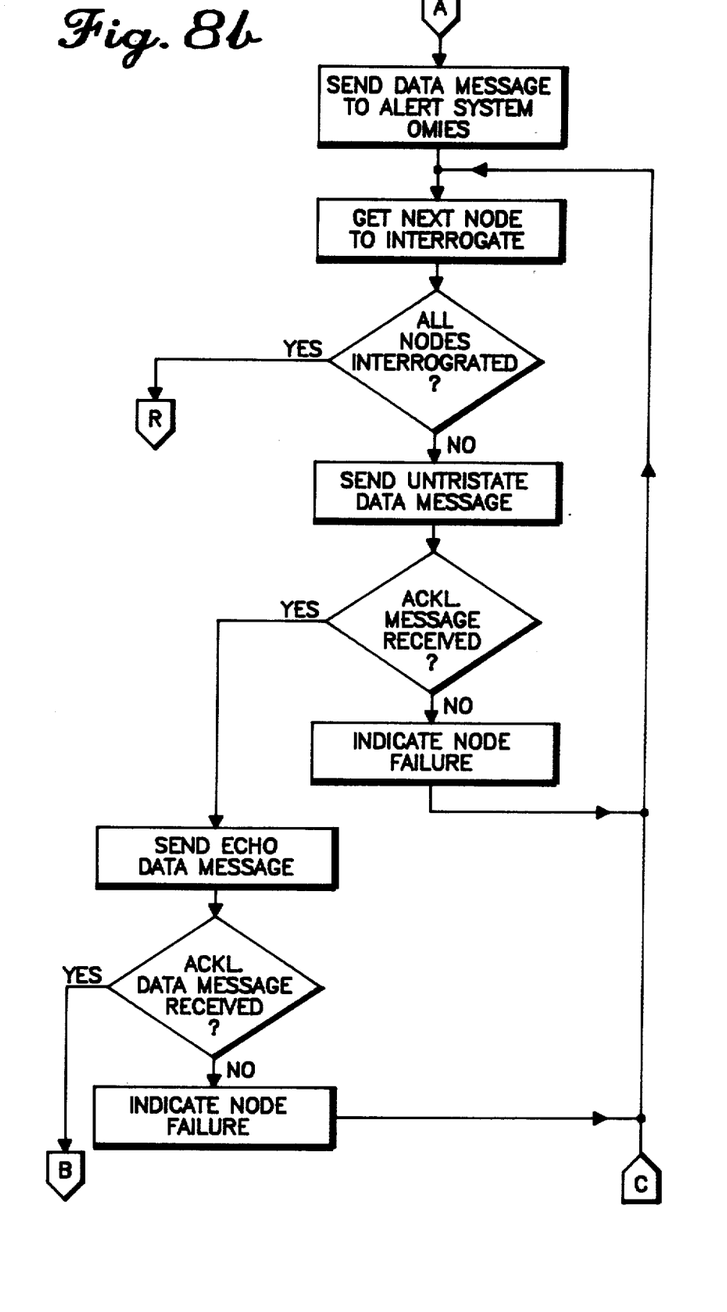

Returning now to FIG. 8A, if the OMI module determines that it passed its selfcheck routine, it proceeds as indicated in FIG. 8B to send a data message to alert all of the system OMI modules that it is the controlling OMI module. This data message will cause all remaining system OMI modules to reinitialize their weighted timers based on the module address of this now controlling OMI module. These OMI modules will continue to reinitialize these timers on every data message which originates from the controlling OMI module during the recovery sequence. This assures that the controlling OMI module can complete the recovery sequence unimpeded by other OMI modules.

The controlling OMI module then obtains the first, or next, node address to interrogate until all modules have been interrogated. If more modules must be interrogated it first sends an untristate data message to this module.

Figure 8C:
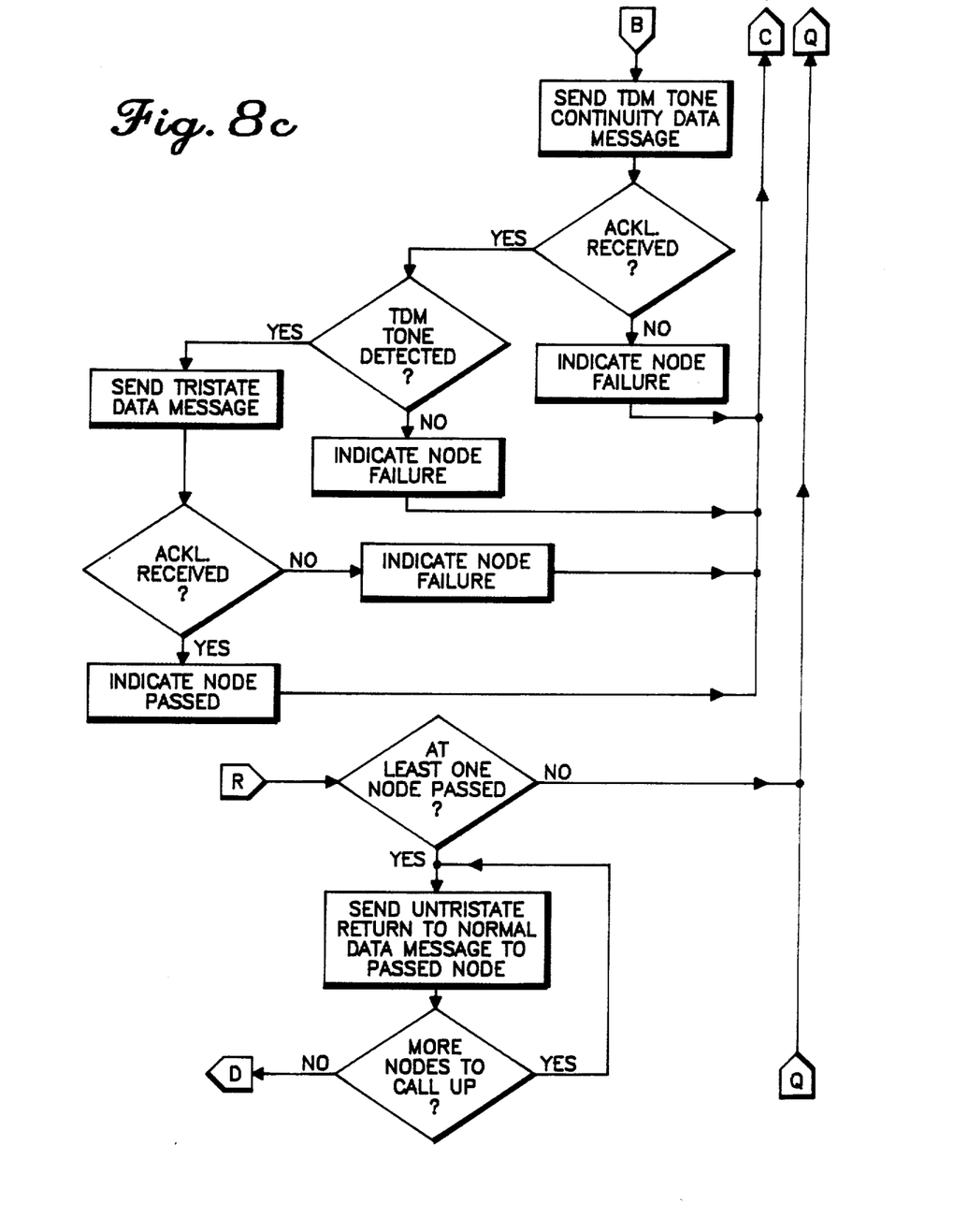

The controlling OMI module then determines whether it has received an acknowledged message back from the module to which it sent the untristate data message. If it did not receive an acknowledgment, this indicates a node failure, and the OMI module then returns to get the next node address. If the controlling OMI module did receive an acknowledged message from the module to which it sent the untristate data message, then it sends an echo data message. It then determines whether it has received an acknowledgment in response to the echo data message. If the answer is "no", this indicates a node failure and the OMI module returns to get the next address message. The echo message verifies that two untristated modules can access the data bus correctly. If two untristated modules can successfully talk to each other, then all system modules which pass this portion of the interrogation should be capable of communicating with each other when all are untristated, as in normal operation. If it had received an acknowledgment to its echo data message, then the controlling OMI module proceeds to send a time division multiplex tone continuity data message as indicated in FIG. 8 C. It then waits to determine whether it has received an acknowledgment. If it has not, this indicates a node failure and it once again returns to obtain the address of the next node to interrogate. If the answer is "yes", then it determines whether it detected a time division multiplex tone. This determines whether the interrogated module is placing data onto the bus within the correct time slot. Failure to source guard tone into the correct TDM slot could mean that another slot user is experiencing difficulty in using its TDM slot under normal operating conditions. If the answer is "no", then this indicates a node failure and the controlling OMI module returns to obtain the next module address. If the answer was "yes", then the controlling OMI module sends a tristate data message to tristate the module being interrogated. As indicated on the flow chart, the controlling OMI module proceeds to determine whether it has received an acknowledgment to its tristate data message as indicated in FIG. 8C. If the answer is "no", this again indicates a node failure. If it did however receive an acknowledgment to its tristate data message, this indicates that the module or node has passed which is noted by the controlling OMI module, and then the controlling OMI module returns to obtain the address of the next module to be interrogated.

Figure 8D:
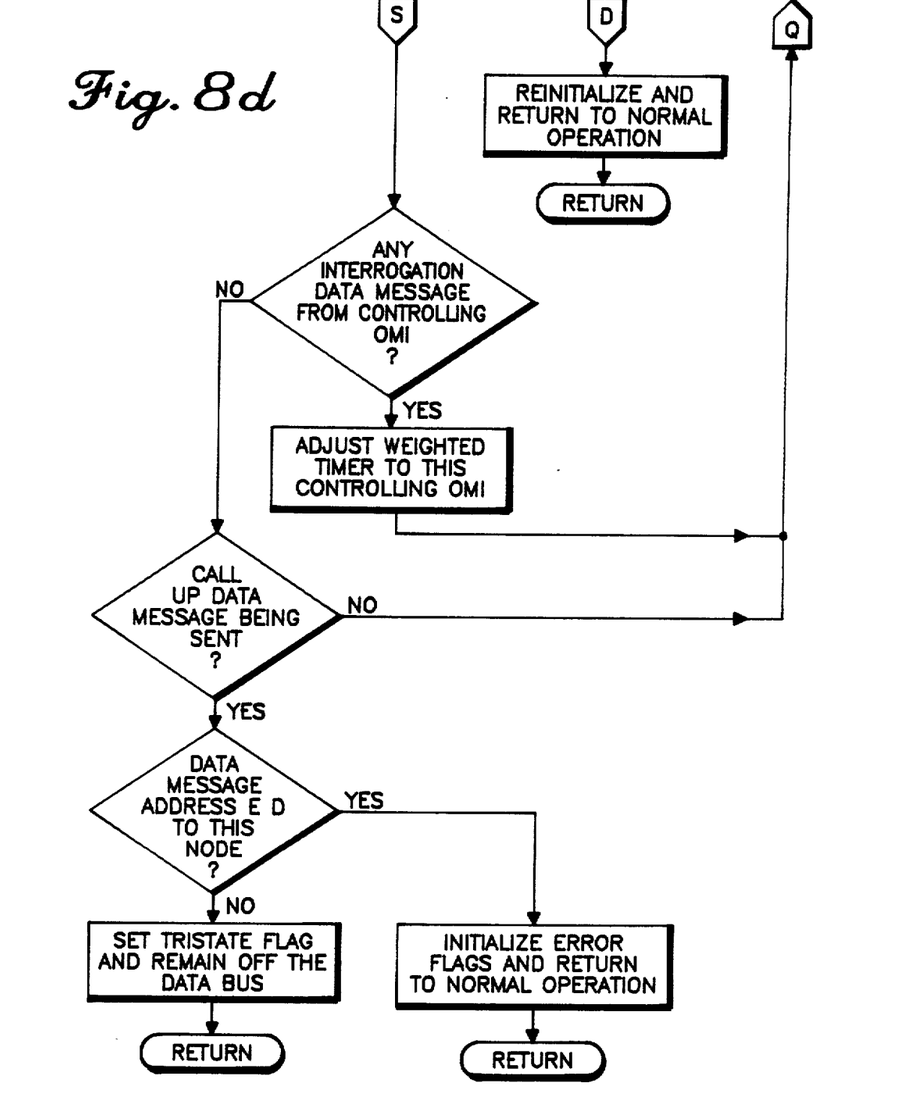

This sequence continues for each module in the system until all of the modules have been interrogated. As indicated in FIG. 8B, if all of the modules have been interrogated, then the controlling OMI module proceeds to determine whether at least one node passed the interrogation. Even though the controlling OMI module may have successfully passed the selfchecks before polling the other modules, it may still be possible that this OMI module has failed in such a manner so as to inhibit other nodes from successfully accessing the data bus. For this reason, at least one interrogated module must have successfully passed to conclude the recovery sequence. As indicated in FIG. 8C, if the answer is "yes", then the controlling OMI module sends an untristate message to each passing module for recovering the system. After each untristate message, the controlling OMI module determines whether more nodes are to be called up. If the answer is "yes", the controlling OMI module continues to send the untristate data message to all of the passing nodes. If the answer is "no", then the controlling OMI module proceeds to reinitialize and return the system to normal operation as indicated in FIG. 8D and then returns to the executive control.

Returning to FIG. 8A, the execution path that an OMI module takes while waiting for its weighted timer to expire will be discussed. If the OMI module determines that its weighted timer had not expired, then it proceeds, as illustrated in FIG. 8D, to determine if any interrogation data message from the controlling OMI module has been sent. If the answer is "yes", as indicated in FIG. 8E, the OMI module will adjust its weighted timer to this controlling OMI module so that its timer will not time out before the controlling OMI module has had an opportunity to interrogate all modules within the system. This listening OMI module will, at this time, determine if this interrogation message is addressed to it. If true, then this OMI module will proceed with any necessary action and respond with the correct acknowledgment message as previously described. The OMI module then returns to determine whether its weighted timer has timed out as indicated in FIG. 8A.

If the OMI module does not detect interrogation messages from the controlling OMI module, it will then look for the presence of "call up" messages which signify the conclusion of the recovery sequence and return to normal operation. "Call up" messages contain the specific module address of those modules which passed the interrogation process. This OMI module will look for a message addressed to it. If the answer is "no", then this OMI module has failed the interrogation. If the answer is "yes", then this OMI module has passed the interrogation. If the OMI module did not pass the interrogation, then as indicated in FIG. 8D, it sets its tristate flag and remains off of the data bus. If it did pass the interrogation, it initializes its error flags and returns to normal operation. This completes the fault isolation and recovery procedure.

What is claimed is:

1. In a distributed processing system of the type including a plurality of modules, a subsystem for isolating faults within said system and recovering said system to optimized operation, said subsystem comprising:
   at least some of some modules being active fault recovery modules including fault detecting means for initializing a fault check routine and sensing faults within said system including faults within a respective module;
   voting means associated with each of said active module for placing a vote during each said fault check routine in response to a detected fault;
   collective vote determining means for recording the votes of said active modules after each said fault check routine;
   means for cooperatively intercoupling each of said voting means and said collective vote determining means; and
   recovery sequence initializing means associated with each active module for initializing a fault isolation and recovery sequence in response to a predetermined number of consecutive collective votes exceeding a predetermined value.

2. A system as defined in claim 1 wherein said modules are distributed along a common bus and wherein said active modules are arranged to tristate from said bus in response to the initializing of said recovery sequence.

3. A system as defined in claim 2 wherein one of said tristated active modules is arranged to untristate and become fully active on said bus within a predetermined time after all said modules are tristated from said bus.

4. A system as defined in claim 3 wherein said untristated module is arranged to perform self-checks to detect faults within itself.

5. A system as defined in claim 3 wherein said untristated module is arranged to switch back to a tristate condition upon detecting a fault within itself.

6. A system as defined in claim 3 wherein another one of said tristated modules is arranged to untristate and become fully active on said bus in response to said one module switching back to said tristate condition.

7. A system as defined in claim 3 wherein said untristated module is arranged to test each said module on said bus for faults.

8. A system as defined in claim 3 wherein said untristated module is arranged to test each said module one at a time in a given sequence.

9. A system as defined in claim 3 wherein said untristated module includes means for testing said modules over said bus.

10. A system as defined in claim 3 wherein said untristated module includes means for untristating each said module, testing each said module, and thereafter tristating each said module.

11. A system as defined in claim 3 wherein said untristated module further includes means for untristating all said modules which have successfully passed said tests after all said modules have been tested to recover said system to optimized operation without the faulting ones of said modules.

12. A system as defined in claim 1 wherein the other, non-active fault recovery modules of said modules are arranged to tristate from said bus within a predetermined time following the initializing of said recovery sequence.

13. A system as defined in claim 1 wherein each said active fault recovery module is arranged for testing all the other of said modules sequentially.

14. A system as defined in claim 13 wherein each said active fault recovery module is arranged for testing the other said modules one at a time in a given sequence.

15. A system as defined in claim 13 wherein each said active fault recovery module includes means for testing itself prior to testing the other said modules.

16. A system as defined in claim 15 further including means for causing the first one of said active fault recovery modules which successfully completes said self test to test the other said modules.

17. A system as defined in claim 16 wherein said active fault recovery modules are arranged to perform said self tests in a given sequence.

18. A system as defined in claim 13 wherein all said modules are arranged for being deactivated upon the initializing of said recovery sequence and wherein said first one of said active fault recovery modules include means for activating the modules which successfully pass said test for recovering said system to optimized operation.

19. A system as defined in claim 1 further including means for detecting when a fault occurs in only a faulty one of said modules, means for resetting said faulty module after one of said collective votes, and means for removing said faulty module from said system.

20. A method of isolating faults and recovering a distributed processing system including a plurality of modules to optimized operation, said method comprising the steps of:
   periodically detecting for faults within said system at given ones of said modules;
   generating a vote a those given ones of said modules detecting a fault within said system, including a fault detected at a respective module;
   collecting said votes such that a collective vote is generated from the respective votes; and initializing a recovery sequence when a predetermined consecutive number of said collective votes exceed a predetermined value.

21. A method as defined in claim 20 including the further step of deactivating all of said modules upon the initializing of said recovery sequence.

22. A method as defined in claim 21 including the further step of activating one module of said given ones of said modules and causing said one module to test the other said modules.

23. A method as defined in claim 22 further including the step of testing said one module internally prior to testing the other said modules.

24. A method as defined in claim 23 including the further step of deactivating said one module if it fails to pass said internal test and activating another one of said given ones of modules and causing said another one of said given ones of modules to test said other modules.

25. A method as defined in claim 22 wherein said one module tests the other said modules one at a time.

26. A method ad defined in claim 25 wherein said step of testing each said other module includes: activating each said module individually, testing each said module, and thereafter deactivating each said module.

27. A method as defined in claim 22 including the further step of activating all said other modules passing said test after all said other modules have been tested to recover said system.

28. A method as defined in claim 27 wherein said one module activates all said other modules passing said test.

29. A method as defined in claim 20 including the further steps of detecting when a fault occurs in only a faulty one of said modules, resetting said faulty module, and removing said faulty module from said system.

* * * * *